J. W. MEYER.
WHEEL.
APPLICATION FILED OCT. 13, 1908.
942,005.
Patented Nov. 30, 1909.
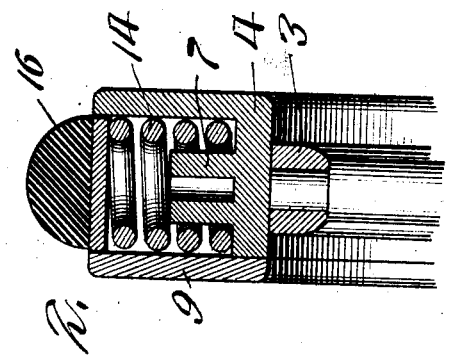
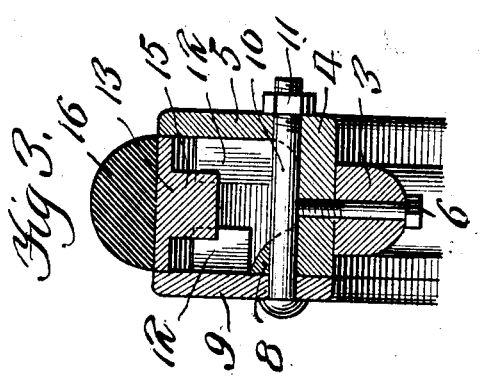
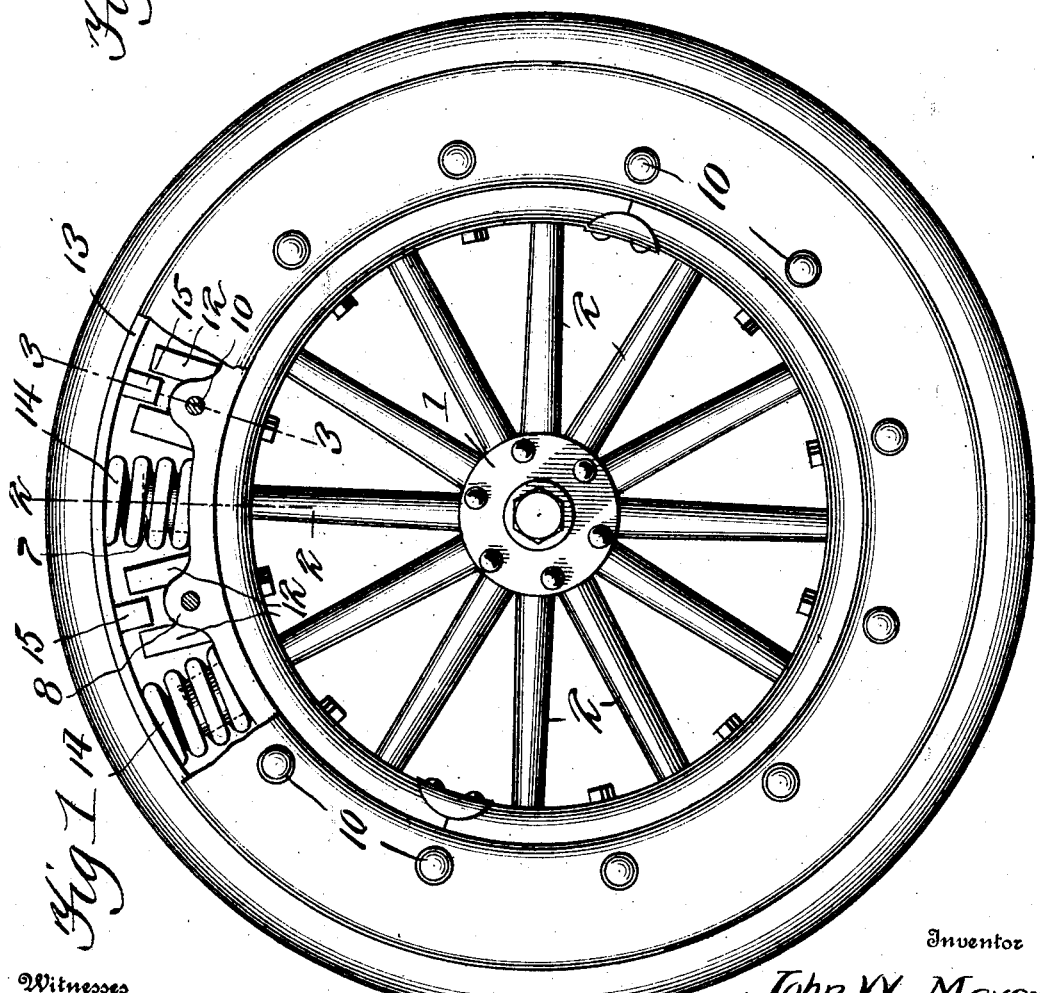
Witnesses
Hugh H. Ott
D. W. Gould.
Inventor
John W. Meyer
By Victor J. Evans
Attorney

UNITED STATES PATENT OFFICE.

JOHN WILLIAM MEYER, OF FREEPORT, ILLINOIS.

WHEEL.

942,005.  Specification of Letters Patent.  Patented Nov. 30, 1909.

Application filed October 13, 1908. Serial No. 457,513.

*To all whom it may concern:*

Be it known that I, JOHN WILLIAM MEYER, a citizen of the United States, residing at Freeport, in the county of Stephenson and State of Illinois, have invented new and useful Improvements in Wheels, of which the following is a specification.

The invention relates to an improvement in wheels, and is particularly directed to a wheel embodying spring means between the tire and hub to insure the desired resiliency of the structure without the use of the ordinary pneumatic tire.

The main object of the present invention is the provision of a wheel structure including a fixed rim which is designed to be secured to the felly proper of the wheel, and a movable rim arranged in spaced relation with the fixed rim by interposed springs, the construction including a means for securing the fixed and movable rims against independent longitudinal movement without interfering with their independent radial movement.

The invention will be described in the following specification, reference being had particularly to the accompanying drawings, in which:—

Figure 1 is a view in elevation of my improved wheel, the cover plate of the same being partly broken out. Fig. 2 is a section on line 2—2 of Fig. 1. Fig. 3 is a section on line 3—3 of Fig. 1.

Referring particularly to the accompanying drawings, wherein is shown the preferred details of construction, my improved wheel comprises a hub 1 from which radiate a series of spokes 2 carrying at their outer ends a fixed felly 3. These parts may be of any desired construction or material, as they do not of themselves form an important part of the present invention.

Secured upon the felly 3 is what I term the fixed rim, approximately of L-shape and including a rim plate 4 designed to bear throughout its length upon the felly and formed at one end with an outwardly extending edge plate 5, preferably arranged at right angles to the rim plate 4 and forming one of the side walls of a spring housing, as will later appear. The rim plate 4 is of greater width than the felly 3 and is secured to the latter at appropriate intervals by bolts 6, and intermediate the bolt connections the outer surface of the rim plate 4 is formed with a series of radially extending hollow studs 7, as clearly shown in Figs. 1 and 2. In transverse alinement with the points of connection of the bolts 6, the edge of the rim plate 4 opposite the side plate 5 is thickened to provide edge extensions 8, the outer surfaces of which aline with the corresponding edge of the plate 4 and extend outwardly from said plate in parallel relation to the plate 5. The extensions 8 form in effect a series of bosses projecting outwardly from the plate 4 in opposition to the side plate 5, these bosses being arranged intermediate the studs 7. A cover plate 9 is designed to be secured to the outer surfaces of the bosses 8, said plate being of such size that when in place it will form a duplicate of the side plate 5, projecting outwardly from the plate 4 in spaced parallel relation with the plate 5. Bolts 10 are arranged to secure the cover plate in place, said bolts passing through the cover plate, the bosses 8, and the side plate 5, the bolts beyond the side plate being preferably provided with securing nuts 11 to prevent accidental displacement of the bolts. In radial alinement with the bosses 8 the relatively inner surfaces of the side plate 5 and cover plate 9 are formed with spaced lugs 12, said lugs extending in parallel relation and being arranged in opposite pairs, as clearly shown in Figs. 1 and 3. As thus constructed the rigid rim and cover plate provide an approximately U-shaped housing open at the outer edge and removably secured to the felly proper of the wheel.

A movable rim 13 is arranged to close the open end of the housing thus provided, said rim comprising an annular plate having a transverse dimension to movably fit between the cover plate and side plate 5 and having a circumferential extent to aline throughout its length with the free outer edges of said plates. The movable rim is supported on coil springs 14, the inner ends of which encircle the studs 7, while the outer ends bear beneath the movable rim, as clearly shown in Fig. 2. The springs are preferably of a diameter to snugly fit the housing whereby to prevent rattling of the parts in the use of the device. Intermediate the bearing points of the springs 14, or more particularly in alinement with the opposing pairs of lugs 12 the movable rim is formed with an inwardly extending radially projecting guide lug 15, which in use is designed to fit loosely, as shown between the opposing pairs of lugs 12 on the plates 5 and 9. The guide lugs are arranged for sliding movement between the lugs 12 so that the movable rim is free for a certain relative radial movement, but is prevented from independent longitudinal or creeping movement.

A tire 16 is secured on the outer surface of the movable rim, and while preferring that this tire be of solid type, it will, of course, be understood that a cushion or pneumatic tire may be used with equal facility without interfering with the effectiveness of the invention.

In the use of the wheel the pressure incident to the load strain will be resisted by the springs 14, and the effectiveness of these springs will be insured as the guiding elements of the movable rim necessitate a true radial movement of said rim in action, or in other words necessitate a movement directly against the tension of the springs.

In a wheel constructed as described the resiliency is insured without the liability of puncture or other disadvantage incident to the use of the pneumatic tire. Furthermore, the wheel is capable of convenient and speedy repair as it will be mounted upon the axle with the cover plate 9 on the outer side, permitting ready access to the interior construction of the wheel by removing said plate.

While the invention contemplates the construction of an entire wheel, it is to be understood that the fixed and movable rims with their intermediate parts may be connected directly to the felly of any of the ordinary types of wheels, whereby the improvement is adapted to be used independently of any particular type of wheel hub, spokes or felly.

Having thus described the invention what is claimed as new, is:—

A wheel including a felly, a fixed rim removably secured thereto and including a rim plate bearing on the felly and an edge plate projecting outwardly from one edge of the rim plate, studs carried by the rim plate, a cover plate removably secured to the fixed rim and projecting from said rim plate in parallel relation to the edge plate, a movable rim arranged between the cover plate and edge plate, springs engaging the studs and bearing against the movable rim, lugs carried by the edge plate and by the cover plate, said lugs being arranged in opposing pairs, the lugs of each pair being in spaced relation and having their inner edges spaced from the similar edges of the opposing pair, and guide lugs carried by the movable rim to fit between the respective lugs of each pair of said opposing pairs.

In testimony whereof I affix my signature in presence of two witnesses.

JOHN WILLIAM MEYER.

Witnesses:
HENRY JAEGER,
E. M. MENLORE.